(No Model.)

J. R. POOR.
FILTER.

No. 345,318. Patented July 13, 1886.

Witnesses.
S. N. Piper
W. B. Torrey

Inventor.
John R. Poor,
by R. H. Eddy atty.

UNITED STATES PATENT OFFICE.

JOHN ROBINSON POOR, OF BOSTON, MASSACHUSETTS.

FILTER.

SPECIFICATION forming part of Letters Patent No. 345,318, dated July 13, 1886.

Application filed March 17, 1886. Serial No. 195,509. (No model.)

*To all whom it may concern:*

Be it known that I, JOHN ROBINSON POOR, of Boston, in the county of Suffolk, of the Commonwealth of Massachusetts, have invented a new and useful Improvement in Filters; and I do hereby declare the same to be described in the following specification, and represented in the accompanying drawings, of which—

Figure 1:
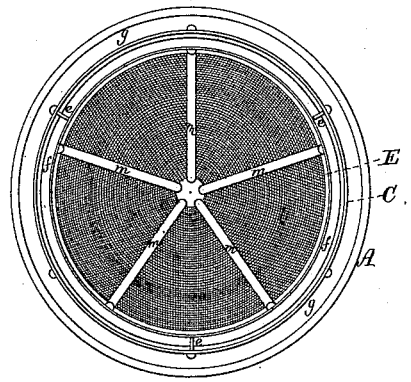
Figure 4:
Figure 2:
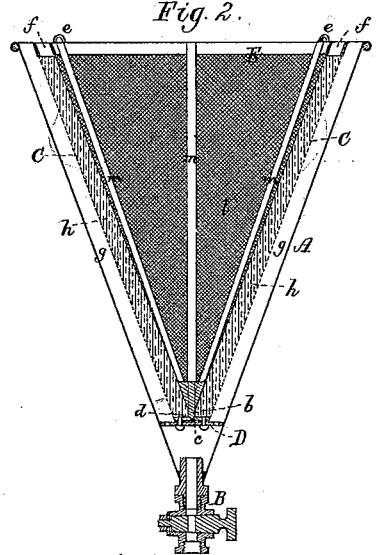
Figure 6:
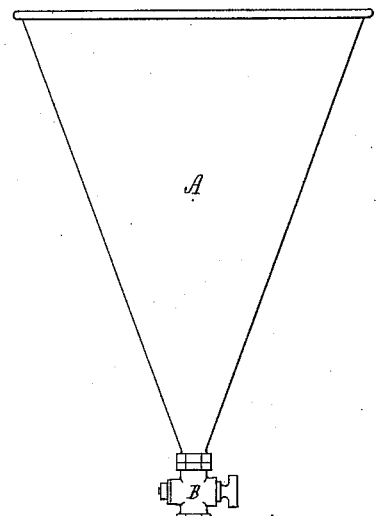
Figure 3:
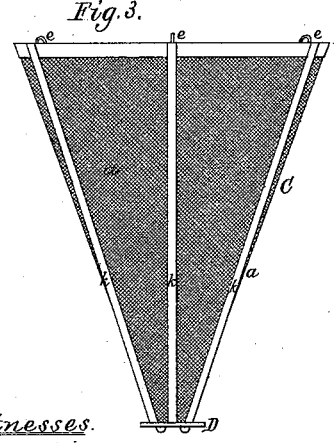
Figure 5:
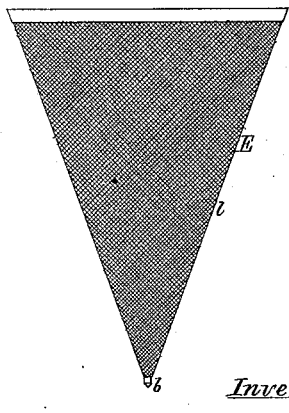

Figure 1 is a top view, and Fig. 2 a median and transverse section, of a filter of my invention, the nature of which is defined in the claim hereinafter presented. Fig. 3 is a side view of the woven-wire conic frustum. Fig. 4 is an under side view of its perforated gage-plate. Fig. 5 is a side view of the woven-wire cone. Fig. 6 is a side view of the filter.

In the drawings, A represents a hollow cone of sheet metal, having at its apex a stop-cock, B, to open out therefrom. Arranged within such cone concentrically thereof is a hollow conic frustum, C, composed of a sheet, $a$, of woven wire, and a suitable supporting-frame, $k$, thereto, there being fixed to such frustum at its lower or smaller end a disk, D, which projects beyond the frustum and in the part so projecting has a series of holes made through it. This disk is to centralize the lower part of the frustum within that of the cone A.

Within the frustum C concentrically is a cone, E, composed of a sheet, $l$, of woven wire, and a suitable supporting-frame, $m$, the said cone having at its apex a bearing-point, $b$, to extend into a conical recess, $c$, at the center of the bottom $d$ of the frustum. By means of projections $e$ in the upper part of the frustum the upper part of the cone is centralized within the frustum, there being a narrow space, $f$, between the cone E and the frustum, and extending entirely around the cone. There is also such a space, $g$, around the frustum and between it and the cone A. By means of the point $b$, the conical recess $c$, and the projections $e$ the woven-wire cone is centralized within the conic frustum.

The space $f$ is filled with paper-pulp $h$, or some other suitable filtering medium, paper-pulp being preferably used.

On pouring a liquid into the cone D, such liquid will pass through the meshes of the woven-wire periphery of such cone, and thence into and through the mass of paper-pulp; thence through the woven-wire periphery of the frustum into the space between the frustum and the cone A; thence, when the stop-cock is open, down through the holes of the disk D, and to and through the stop-cock, such liquid being filtered in the meantime by the mass of paper-pulp.

I am aware that a filter has been made of a solid case having within it the foraminous conical receptacles, and make no broad claim thereto. In my device the three cones are centered so that they are spaced apart the same distance throughout their lengths.

What I claim is—

The combination of the case A, having the stop-cock B at its apex, the woven-wire conic frustum C, having the projections $e$, the perforated gage-disk D and bottom, with recess $c$, the woven-wire cone E, having the point $b$, and filtering material between the cone and frustum, as set forth.

JOHN ROBINSON POOR.

Witnesses:
R. H. EDDY,
R. B. TORREY.